United States Patent
Yaokawa et al.

(10) Patent No.: US 8,712,750 B2
(45) Date of Patent: Apr. 29, 2014

(54) MOLTEN ALLOY SOLIDIFICATION ANALYZING METHOD AND SOLIDIFICATION ANALYZING PROGRAM FOR PERFORMING THE SAME

(75) Inventors: Jun Yaokawa, Nisshin (JP); Yasushi Iwata, Miyoshi (JP); Shuxin Dong, Owariasahi (JP); Yoshio Sugiyama, Seto (JP); Hiroaki Iwahori, Aichi-ken (JP); Takashi Nakamichi, Nagoya (JP); Norihiro Amano, Kasugai (JP); Hiroyuki Ikuta, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 339 days.

(21) Appl. No.: 13/132,770

(22) PCT Filed: Dec. 3, 2009

(86) PCT No.: PCT/IB2009/007644
§ 371 (c)(1),
(2), (4) Date: Jun. 3, 2011

(87) PCT Pub. No.: WO2010/064131
PCT Pub. Date: Jun. 10, 2010

(65) Prior Publication Data
US 2011/0264425 A1  Oct. 27, 2011

(30) Foreign Application Priority Data
Dec. 5, 2008 (JP) ................. 2008-311173

(51) Int. Cl.
| G06F 7/60 | (2006.01) |
| G06G 7/48 | (2006.01) |
| C22C 33/12 | (2006.01) |
| C22C 33/10 | (2006.01) |

(52) U.S. Cl.
USPC ........... 703/12; 703/2; 703/6; 420/19; 420/20

(58) Field of Classification Search
None
See application file for complete search history.

(56) References Cited

U.S. PATENT DOCUMENTS 4,057,097 A * 11/1977 Lux et al. ................ 164/122.1
5,303,763 A * 4/1994 Aghajanian et al. ........... 164/97
(Continued)

FOREIGN PATENT DOCUMENTS

| JP | 5-96343 A | 4/1993 |
| JP | 2000-351061 A | 12/2000 |
| JP | 2003-33864 A | 2/2003 |

OTHER PUBLICATIONS

S. V.'Shepel et al., "Numerical simulation of filling and solidification of permanent mold castings", Applied Thermal Engineering, vol. 22, No. 2, Nov. 6, 2001, pp. 229-248.

(Continued)

Primary Examiner — Omar Fernandez Rivas
Assistant Examiner — Nithya J Moll
(74) Attorney, Agent, or Firm — Sughrue Mion, PLLC (57) ABSTRACT

A molten alloy solidification analyzing method of the invention is characterized in that the amount of change in fraction solid is calculated based on the solidification rate of molten alloy and the solidification rate parameter that is a parameter for evaluating the influence of the solidification rate on solidification of the molten alloy, according to the fraction solid. By conducting such a simulation that takes into consideration the supercooling, a highly accurate solidification analysis is relatively easily performed for various molten alloys.

12 Claims, 9 Drawing Sheets

(56) References Cited

U.S. PATENT DOCUMENTS

| | | | |
|---|---|---|---|
| 5,968,292 A * | 10/1999 | Bergsma | 148/437 |
| 7,024,342 B1 * | 4/2006 | Waite et al. | 703/6 |
| 7,257,520 B2 * | 8/2007 | Castro et al. | 703/2 |
| 7,343,960 B1 * | 3/2008 | Frasier et al. | 164/133 |
| 7,974,818 B2 * | 7/2011 | Sakurai et al. | 703/2 |

OTHER PUBLICATIONS

W.J. Boettinger et al., "Phase-Field Simulation of Solidification", Annual Review of Materials Science, vol. 32. Aug. 31, 2002, pp. 163-194.

S. Koroyasu et al., "Effects of Undercooling on Solidification Characteristics by Solidification Simulation," J. JFS., vol. 78 No. 1 (2006) pp. 3-8.

Ch.-A. Gandin et al., "A Three-Dimensional Cellular Automaton-Finite Element Model for the Predication of Solidification Grain Structures", Metallurgical and Materials Transaction A, vol. 30, No. 12 (1999), p. 3153.

International Search Report and Written Opinion for corresponding International Patent Application PCT/IB2009/007644 mailed Dec. 22, 2010.

International Preliminary Report on Patentability for corresponding International Patent Application No. PCT/IB2009/007644 mailed May 3, 2011.

* cited by examiner

EQUATION OF CONTINUITY $$\frac{\partial u}{\partial x} + \frac{\partial v}{\partial y} + \frac{\partial w}{\partial z} = 0 \quad \cdots\cdots(1\text{-}1)$$

NAVIER-STOKES EQUATION $$\frac{\partial u}{\partial t} + u\frac{\partial u}{\partial x} + v\frac{\partial u}{\partial y} + w\frac{\partial u}{\partial z} = -\frac{1}{\rho}\frac{\partial p}{\partial x} + \nu\left(\frac{\partial^2 u}{\partial x^2} + \frac{\partial^2 u}{\partial y^2} + \frac{\partial^2 u}{\partial z^2}\right) + Gx$$

$$\frac{\partial v}{\partial t} + u\frac{\partial v}{\partial x} + v\frac{\partial v}{\partial y} + w\frac{\partial v}{\partial z} = -\frac{1}{\rho}\frac{\partial p}{\partial y} + \nu\left(\frac{\partial^2 v}{\partial x^2} + \frac{\partial^2 v}{\partial y^2} + \frac{\partial^2 v}{\partial z^2}\right) + Gy \quad \cdots\cdots(1\text{-}2)$$

$$\frac{\partial w}{\partial t} + u\frac{\partial w}{\partial x} + v\frac{\partial w}{\partial y} + w\frac{\partial w}{\partial z} = -\frac{1}{\rho}\frac{\partial p}{\partial z} + \nu\left(\frac{\partial^2 w}{\partial x^2} + \frac{\partial^2 w}{\partial y^2} + \frac{\partial^2 w}{\partial z^2}\right) + Gz$$

EQUATION OF VOF (TRACKING OF INTERFACE)

$$\frac{\partial F}{\partial t} + \frac{\partial Fu}{\partial x} + \frac{\partial Fv}{\partial y} + \frac{\partial Fw}{\partial z} = 0 \quad \cdots\cdots(1\text{-}3)$$

$u$: FLOW SPEED IN $x$ DIRECTION
$v$: FLOW SPEED IN $y$ DIRECTION
$w$: FLOW SPEED IN $z$ DIRECTION
$p$: PRESSURE
$G\ x,y,z$: GRAVITY TERM IN $x,y,z$ DIRECTIONS
$F$: VOLUME OF FLUID
$C$: SPECIFIC HEAT
$k$: THERMAL CONDUCTIVITY
$\rho$: DENSITY
$\nu$: KINEMATIC VISCOSITY COEFFICIENT

MOLTEN ALLOY SOLIDIFICATION ANALYZING METHOD AND SOLIDIFICATION ANALYZING PROGRAM FOR PERFORMING THE SAME

BACKGROUND OF THE INVENTION

1. Field of the Invention

The invention relates to a solidification analyzing method of analyzing solidification of molten alloy that can be used to conduct a die-casting simulation or the like, and to a solidification analyzing program for performing the solidification analyzing method.

2. Description of the Related Art

When parts made of aluminum (Al) alloy, magnesium (Mg) alloy, etc. are mass-produced, mold casting (die casting) is often used that is excellent in dimensional stability and by which a smooth casting surface is obtained. In the case of die casting, typically, a high pressure of approximately 20 to 80 MPa is applied to inject molten alloy into a cavity in a mold and the molten alloy is rapidly cooled to produce a casting.

However, even in the case of die casting, the solidification conditions of the molten alloy in the respective portions in the cavity vary depending on the path from the molten alloy supply position, the form of the cavity, etc., and a problem of occurrence of shrinkage cavity due to the solidification contraction can arise. Thus, conventionally, the optimum conditions were determined by repeating trial and error, such as changing the cooling conditions of the mold, in order to eliminate such a defect.

Such a method naturally needs high cost and the development efficiency is low. Thus, instead of trial and error using actual things, a method is becoming popular, in which with the use of computer simulation, the flow of the molten alloy and the solidification conditions during die casting are estimated in advance and, based on the obtained result, the search for the appropriate die casting conditions is efficiently conducted.

As such a method of analyzing solidification using simulation, an enthalpy method, an equivalent specific heat method, and a temperature recovery method, which are based on an equilibrium solidification model, and a local-equilibrium solidification model, in which local equilibrium between solid and liquid is assumed and solute distribution and segregation are taken into consideration, are frequently used. However, in such simulation based on (quasi)static model, the supercooling solidification phenomenon that occurs during actual casting is not taken into consideration and therefore, the analysis of temperature field and the solidification analysis are not always highly accurate. In particular, in the casting process, such as industrially important die casting, in which the cooling rate is high, the degree of supercooling is very high and it is necessary to take into consideration the supercooling solidification phenomenon in order to accurately predict the occurrence of casting defect.

A solidification analyzing method that takes into consideration the supercooling solidification phenomenon is described in Japanese Patent Application Publication No. 2003-33864 (JP-A-2003-33864) or "A Three-Dimensional Cellular Automaton-Finite Element Model for the Predication of Solidification Grain Structures", Metallurgical and Materials Transaction A, Vol. 30, No. 12 (1999), p. 3153 (Non-Patent Document 1). Specifically, in these documents, there is a description concerning a method of analyzing solidification based on the nucleation/solidification-and-growth model with the use of the cellular automaton method. Specifically, the amount of nucleation in a nucleation model and the crystal growth rate in a solidification-and-growth model are treated as a function of the degree of supercooling and, focus is placed on the difference between the amount of emission of latent heat that is calculated based on the crystal growth rate and the amount of heat transferred to the surrounding area, whereby the supercooling solidification phenomenon is taken into consideration. However, the amount of nucleation when the solid nuclei are produced in the molten alloy is not the characteristic value concerning solidification that is accurately determined through experiment. Thus, in the case of the analyzing method in which the above-described cellular automaton method is used, the parameters related to the amount of nucleation are empirically given and therefore, it is difficult to incorporate the degree of supercooling during the supercooling solidification into the simulation with high accuracy. In addition, in the cellular automaton method, the time required to perform the analysis is very long and therefore, the cellular automaton method is not practical as the solidification analyzing method used for industrial products or utility articles.

In Japanese Patent Application Publication No. 5-96343 (JP-A-H05-96343), although not the die casting simulation, there is a description concerning a simulation of casting using cast iron. In this simulation, the supercooling solidification phenomenon is taken into consideration with the use of (i) the dependency of the number of graphite grains on cooling rate in a nucleation model and (ii) the speed of increase in the radii of graphite grains in a crystal growth model. In this case, because the number of graphite grains is the characteristic value concerning solidification that is experimentally determined with high reproducibility, it becomes possible to perform highly accurate solidification analysis with the supercooling solidification taken into consideration. However, the subject of this analysis is limited to the casting of nodular cast iron, the number of graphite grains in which can be measured, the Compacted Vermicular (CV) cast iron or the like that has a high glomeration rate and this simulation cannot be used for the die casting using Al alloy or Mg alloy that is employed for industrial use in many cases.

In "Influence of Degree of Supercooling on Solidification Characteristics in Solidification Analysis," Foundry Engineering, Volume 78 (2006) No. 1 (Non-Patent Document 2), a solidification analyzing method obtained by adding the analysis of the amount of change in the fraction solid to the temperature recovery method, which is the equilibrium solidification analyzing method. Specifically, the supercooling solidification phenomenon is analyzed by appropriately estimating the amount of change in the fraction solid per unit time. However, in Non-Patent Document 2, the method of calculating the amount of increase in the fraction solid is treated as an issue, and it is difficult to match the experimental results and the analysis results. In addition, the method described in Non-Patent Document 2 does not reproduce the temperature recovery phenomenon (recalescence phenomenon) when the fraction solid is low, such as immediately after the start of solidification.

SUMMARY OF THE INVENTION

The invention provides a solidification analyzing method that can be widely used for mold casting including die casting and with which the supercooling solidification phenomenon of molten alloy during casting can be accurately analyzed on a computer, and a solidification analyzing program for performing the solidification analyzing method.

The inventors of the present invention have diligently conducted research and after a lot of trial and error, the inventors have newly found that, during supercooling (in particular, during continuous cooling), there is a correlation between the cooling rate and the degree of supercooling that is the difference between the eutectic solidification temperature in a supercooling state and the eutectic solidification temperature in an equilibrium state. Based on this fact, the inventors have successfully simulated the supercooling solidification phenomenon of molten alloy during casting with high accuracy on a computer by using a supercooling solidification model, in which the time rate of change in the eutectic solidification (solidification rate) is expressed by the degree of supercooling and an appropriate parameter determined by the fraction solid is applied to the solidification rate. Then, by developing the outcome, the inventors have made the various inventions described below.

A molten alloy solidification analyzing method of analyzing solidification of molten alloy according to the invention, characterized by comprising: a model setting step of setting a mold model obtained by modeling a mold that forms a cavity, into which the molten alloy is filled, in a coordinate system; and a solidification analyzing step of calculating a solidification process step by step, in which the molten alloy is solidified, based on a fraction solid that is a percentage of solidification of the molten alloy filled into the cavity in the set mold model, wherein the model setting step includes: a model forming step of forming the mold model by associating a form of the mold model with coordinates in the coordinate system; an element creating step of creating a plurality of infinitesimal elements, into which a region in the formed mold model is divided; and an element defining step of defining, among the created infinitesimal elements, the infinitesimal element in a cavity region in the mold model as a cavity element, and the infinitesimal element in a mold region in the mold model as a mold element, and the solidification analyzing step includes a fraction solid change amount calculating step of calculating a fraction solid change amount that is the amount of change in the fraction solid in a filled element that is the cavity element containing the molten alloy, based on a solidification rate that is a time rate of change of the amount of solidification determined by the kind of the alloy and on a solidification rate parameter that is a parameter for evaluating the influence of the solidification rate on solidification of the molten alloy, according to the fraction solid.

In the molten alloy solidification analyzing method of the invention, in the fraction solid change amount calculating step in the solidification analyzing step, the fraction solid change amount is calculated based on the solidification rate that is a characteristic value that can be experimentally verified for each kind of alloy and on a solidification rate parameter that properly evaluates the influence of the solidification rate on the solidification of the molten alloy. In this way, the mode of supercooling solidification in the filled element containing molten alloy is accurately expressed and it becomes possible to obtain a highly accurate simulation result that is highly consistent with the actual measurement values in an actual die casting or the like. According to the molten alloy solidification analyzing method of the invention, it is possible to use an algorithm that is obtained by incorporating the fraction solid change amount calculating step into a conventional algorithm, such as the temperature recovery method, and as in the case of the conventional solidification analyzing method, a highly accurate solidification analysis is relatively easily performed at a high speed or within a practical length of calculation time. Thus, with the use of the invention, even in the common design and development stage for casting, it is possible to relatively easily perform a highly accurate prediction of the occurrence of casting defect. Thus, the preferable mold form and casting conditions or die casting conditions, etc. are efficiently determined and it is possible to reduce the costs for developing a molded article.

In this specification, the molten Al alloy and molten Mg alloy are named as representative examples of the molten alloy and the die casting is mainly taken up as the representative example of casting. For example, as an Al alloy, the casting Al alloy (ADC12 (JIS), for example) containing 10 to 13 mass % of silicon (Si) when the whole is 100 mass % is a typical example. However, the idea of the invention is limited to neither a particular molten alloy nor a particular casting method. Needless to say, the specific mode of the supercooling solidification characteristics varies depending on the molten alloy and the casting method. For example, the invention may be used for solidification analysis for zinc (Zn) alloy, copper (Cu) alloy, cast steel, cast iron (flake graphite cast iron, nodular cast iron, etc.), in addition to Al alloy and Mg alloy.

The invention is not limited to the invention of "method" described above and may be construed as the invention of "thing." Specifically, the invention may be a program for analyzing solidification of molten alloy, characterized by causing a computer to perform the molten alloy solidification analyzing method described above.

If a program is not construed as a "thing," the invention may be construed as a computer-readable storage medium storing the program. Further, the invention may be construed as a molten alloy solidification analyzing apparatus for executing the program. In these cases, the "step" of the invention may be replaced by "means." Specifically, the model setting step may be replaced by a model setting means, the filling analyzing step may be replaced by a filling analyzing means, and the solidification analyzing step may be replaced by a solidification analyzing means.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

The invention will be described in more detail with reference to an embodiment of the invention. In this specification, a "method of analyzing solidification of molten alloy" of the invention will be mainly described for convenience. However, the contents described in the specification are applied not only to the solidification analyzing method but also to a program (program for analyzing solidification of molten alloy) or the like that is used to execute the method, as appropriate. Which of the embodiments is the best depends on the subject, required performance, etc.

Figure 1:
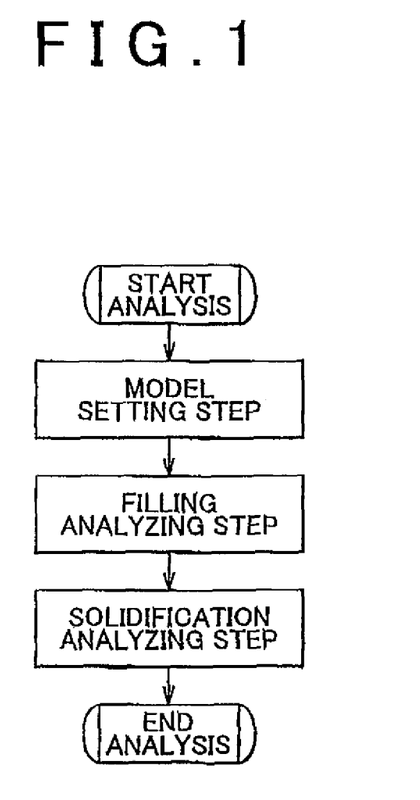
FIG. 1 shows a main flow chart showing a process procedure of a method of analyzing solidification of molten alloy of the invention.

As shown in FIG. 1, the solidification analyzing method of the invention includes a model setting step, a filling analyzing step, and a solidification analyzing step. These steps will be described below in order. Each of the steps described below can be executed by a means that is set as a logic on a computer.

<Model Setting Step>

Figure 2:
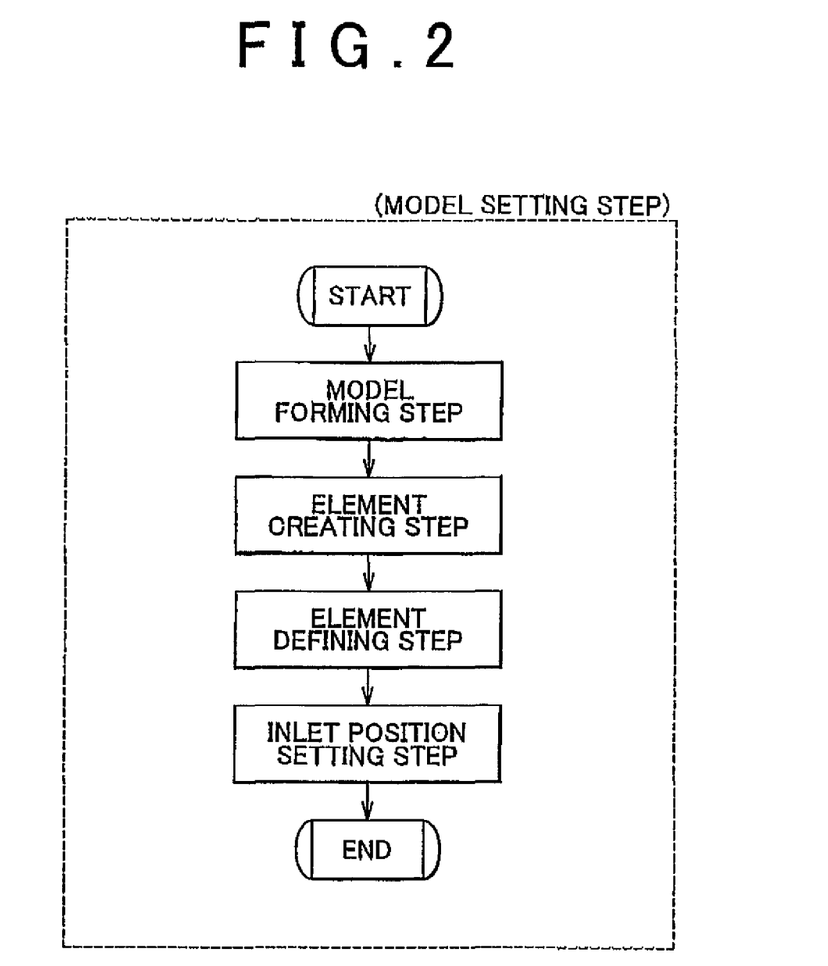
FIG. 2 is a sub-flow chart illustrating a model setting step in the main flow chart.

The model setting step is a step of setting a mold model that is a model of a mold in a coordinate system, which mold forms a cavity, into which molten alloy is filled. The model setting step includes a model forming step, an element creating step, an element defining step, and an inlet position setting step, as shown in FIG. 2.

(a) Model Forming Step

The model forming step is a step of forming a mold model by associating the form of a mold with the coordinates in the coordinate system. When the mold is made up of a plurality of mold members, it is not necessary that the form of each of the mold members in the mold model is individually associated with the coordinates in the coordinate system. It suffices that the form of the entire mold is associated with the coordinates in the coordinate system.

Associating the form (in particular, outer profile) of the mold or the mold members with the coordinates in the coordinate system can be performed by converting the form into numerical data. If there is already CAD data or the like of the form of the mold, it is efficient to use such data. Needless to say, the numerical data can be obtained through computer-aided engineering (CAE), a solidification analyzing simulator, etc. instead of using the CAD data. Alternatively, the form of an actual mold or an actual die casting that has been prototyped may be converted into numerical data with the use of a three-dimensional scanner or the like and a mold model may be formed from the numerical data.

Note that although, in general, the used coordinate system is the Cartesian coordinate system, the used coordinate system is not limited to the Cartesian coordinate system. It is preferable that an appropriate coordinate system, such as the cylindrical coordinate system or the spherical coordinate system, that is suitable for the shape of the mold and the analyzing method be selected.

(b) Element Creating Step

The element creating step is a step of creating a number of infinitesimal elements, into which the region representing a mold model formed in the model forming step is divided. Specifically, the element creating step is a step of dividing the mold model, associated with the coordinates in the coordinate system, into the infinitesimal elements. This step divides the space in the coordinate system defined by the mold model into a number of infinitesimal elements, each of which is a polyhedron. The number of division or the division width may be set appropriately in consideration of the analysis accuracy, the calculation time, etc.

The elements may have an arbitrary shape. The element may be a rectangular parallelepiped like that used in the finite difference method or may be a polyhedron, suitable for the shape of a mold, like that used in the finite element method. When the finite difference method is used, there are advantages that division into the infinitesimal elements is easy and the analysis becomes mathematically simpler. It is not necessary that all the infinitesimal elements have the same size. The infinitesimal elements may be locally set fine to improve the analysis accuracy. For example, the infinitesimal elements may be set fine for the portions, in which, during casting, flow of molten alloy is not smooth and/or gas porosities are easily formed.

It is not always necessary that division into the infinitesimal elements is performed for the entire region (space) in the mold model. The division may be performed to the extent required to perform the filling analyzing step or the solidification analyzing step, that is, to the extent required to create the elements of the cavity region and of the boundary of the cavity region.

(c) Element Defining Step

The element defining step is a step of defining the infinitesimal elements in the cavity region in the mold model among a number of infinitesimal elements created in the element creating step as cavity elements and defining the infinitesimal elements in the mold region in the mold model as mold elements. In this step, the cavity element that is not filled with the molten alloy is defined as an empty element, the cavity element that contains the molten alloy is defined as a filled element, and the elements at the boundary between the cavity elements and the mold elements are defined as surface elements. In short, the element defining step is a step of defining the attribute of each of the infinitesimal elements for the purpose of the filling analyzing step or the solidification analyzing step.

In the case of the mold casting, in some cases, the casting is cooled and solidified by bringing the inside and/or the surface of the mold into contact with coolant (cooling water or the like) to cool the mold. In particular, in the case of die casting, a series of casting steps have to be finished within a short period of time to efficiently mass-produce the castings and therefore, in many cases, the mold is constantly subjected to forced cooling. In such a case, the elements corresponding to the passage, through which the coolant passes, may be defined as cooling passage elements, for example, separately from the mold elements. Otherwise, instead of defining the elements corresponding to the cooling passage as special elements, the particular mold elements that are next to the cooling passage may be selected and the attribute, such as temperature, may be separately defined for the selected elements. In any case, it suffices that the elements that well approximate the actual die casting conditions are set so as to carry out a highly accurate die casting simulation.

The element defining step is a step performed after the above-described element creating step. However, there is no need to perform the element defining step after all the infinitesimal elements have been created in the element creating step. Specifically, every time one or more infinitesimal elements are created in the element creating step, the element defining step that defines the attribute of the created infinitesimal element(s) may be performed and this operation may be repeated.

The "mold region" in this specification is a region that forms the mold itself, that is, the mold region is the area that is not filled with the molten alloy. The "cavity region" is the area that is filled with the molten alloy and in which the molded article, such as casting, is finally formed. The interface between the "mold region" and the "cavity region" may be defined as the boundary region. A part of the "mold region" may be defined as the cooling passage region described above.

Figure 3:
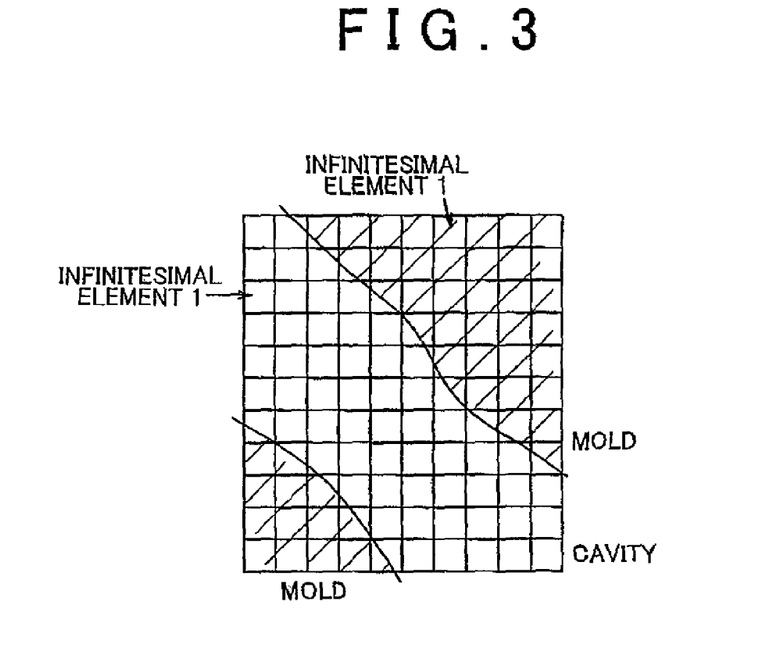
FIG. 3 is a schematic diagram showing how a mold model is divided into infinitesimal elements.
Figure 4:
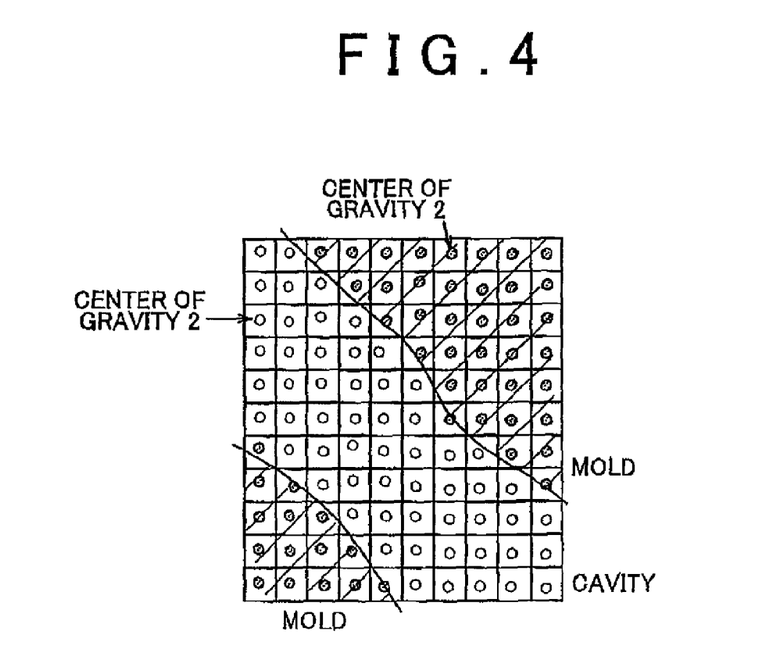
FIG. 4 is a schematic diagram showing how the infinitesimal elements obtained by division are defined as mold elements and cavity elements.

The method of defining the infinitesimal elements as the cavity elements, the mold elements, etc. is not particularly limited. An example is shown in FIGS. 3 and 4. In the following description, the mold model and the infinitesimal elements are treated two-dimensionally. However, essentially, the same applies also in the case of three dimensions.

FIG. 3 shows a case where the Cartesian coordinate system is used and the infinitesimal element 1 is square (the infinitesimal element is a polyhedron, such as a rectangular parallelepiped, a cube, etc. in the case of three dimensions). The wavy lines on the grid of coordinates represent the boundaries of the cavity. When the center of gravity 2 of an infinitesimal element 1 is in the mold region (diagonally shaded area), the infinitesimal element 1 is defined as the mold element. When the center of gravity of an infinitesimal element 1 is in the cavity region, the infinitesimal element 1 is defined as the cavity element.

A state where each of the infinitesimal elements 1 is defined as the mold element or the cavity element is shown in FIG. 4. The element, of which the center of gravity 2 is in the mold region, is represented by an open circle and the element, of which the center of gravity 2 is in the cavity region, is represented by a filled circle. Note that the infinitesimal element 1 that belongs to neither the mold region nor the cavity region may be defined so as not to become a burden in the calculation.

(d) Inlet Position Setting Step

The inlet position setting step is a step of assigning the inlet position, at which the molten alloy is poured, to a selected cavity element(s) that is/are selected from the cavity elements near a plunger that pushes the molten alloy. Normally, the inlet position is a point at cavity elements near the die matching surface at the front of the plunger. Through the point, at which the inlet position is set, the molten alloy is injected. Although the number of the selected cavity element(s) may be one, typically, a plurality of selected cavity elements are set in accordance with the shape of the plunger. The inlet position may be set so as to move with the plunger that pressurizes the molten alloy.

<Filling Analyzing Step>

The filling analyzing step is a step of calculating the filling process step by step, through which the molten alloy is filled into the cavity in the set mold model. Through this step, the physical behavior of the molten alloy filled into the cavity is analyzed for each of the infinitesimal elements at infinitesimal time intervals. This filling analyzing step is not essential to the invention. However, when a highly accurate simulation is performed that is consistent with the actual values, the filling analyzing step is performed together with the solidification analyzing step described below in many cases. Thus, the filling analyzing step will be described below.

Figure 5:
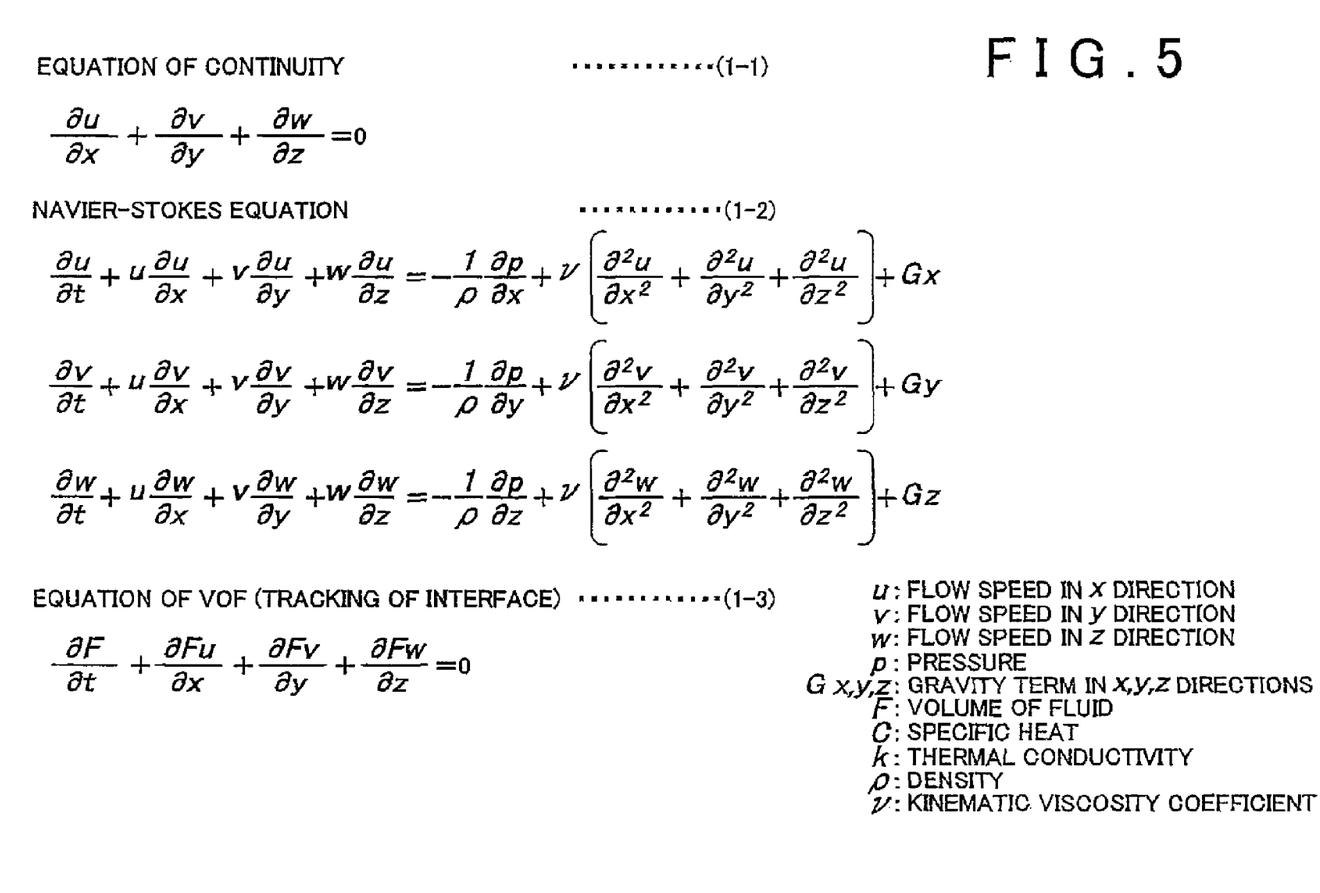
FIG. 5 is a diagram showing basic equations used in analysis of filling.
Figure 6:
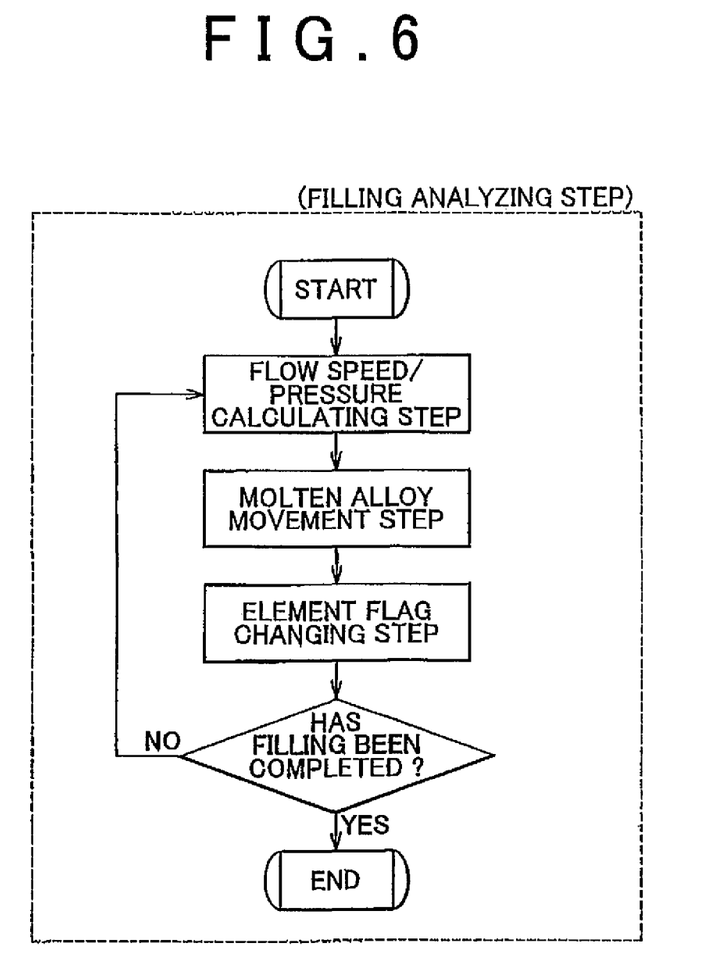
FIG. 6 is a sub flow chart illustrating a filling analyzing step in the main flow chart.

The specific calculation method is not particularly limited. A well-known method or a commonly used method can be used. For example, the volume of fluid (VOF) method, the solution algorithm (SOLA), or the flow analysis network (FAN), or its modification can be used. The basic equations used in these analyses are the Equation of Continuity (1-1), the Navier-Stokes Equation (1-2), the VOF (tracking of boundary) (1-3) as shown in FIG. 5. The filling analyzing step includes the flow speed/pressure calculating step, the molten alloy movement step, and the element flag changing step as shown in FIG. 6, for example.

(a) Flow Speed/Pressure Calculating Step

In the flow speed/pressure calculating step, for the filled elements and the surface elements, the flow speed is calculated from the Navier-Stokes Equation and the equation of continuity. The "pressure" herein means the pressure of the molten alloy.

(b) Molten Alloy Movement Step

In the molten alloy movement step, the amount of fluid that moves within an infinitesimal period of time is calculated from the equation of the volume of fluid. Thus, the degree of filling of each of the cavity elements is expressed by a filling factor (volume of fluid). For example, when the filling factor is zero, the element is the empty element and when the filling factor is greater than zero, the element is the filled element. Thus, in this specification, the infinitesimal element that contains the molten alloy even if only a little (the cavity element that has the filling factor greater than zero and equal to or less than one), is called the "filled element." On the other hand, the infinitesimal element that has a filling factor of zero is called the "empty element."

(c) Element Flag Changing Step

In the element flag changing step, void pressure (air pressure in the cavity) is givnen to the surface elements as a boundary condition. These steps are repeated until filling of the molten alloy is completed. The completion of the filling is determined by checking the kind of the cavity element and determining whether 90% or more of the cavity elements have become the filled elements. Alternatively, the completion of the filling may be determined based on the time, at which the filling time has elapsed that has been calculated in advance based on the initial amount of molten alloy and the volume of the cavity. When there are unfilled elements, the temperature thereof may be determined by successively applying the temperature of the adjacent element thereto.

<Solidification Analyzing Step>

(1) Definition of Solidification Characteristics (a) Solidification Analyzing Step The solidification analyzing step is a step of performing step-by-step calculations for the solidification process, in which the filled molten alloy is solidified. As a precondition used in performing the actual calculations, solidification characteristics are defined that are determined based on the kind of the alloy (molten alloy). The solidification characteristics include solidification rate (function), a solidification rate parameter, etc. that are experimentally determined for each kind of alloy, as well as the physical property values that depend on the kind of alloy, such as the specific heat (c), the solidification latent heat (L), and the eutectic solidification temperature in an equilibrium state. The solidification rate and the solidification rate parameter may be given in the form of a function or may be given in the form of a database containing numerical values. The solidification rate and the solidification parameters will be described in detail below.

(b) Solidification Rate

The solidification rate is the time rate of change of the amount of solidification that is specific to the kind of alloy. As described above, it is possible to obtain a highly-accurate simulation result through a supercooling solidification analysis that takes the solidification rate into consideration. The study conducted by the inventors of this application has revealed that the solidification rate is for example expressed by a linear function of the cooling rate or an exponential function of the degree of supercooling of the molten alloy. According to the solidification analyzing method of the invention, the degree of supercooling is relatively easily calculated and therefore, the solidification rate is also easily calculated using the degree of supercooling. In particular, the solidification rate is given in the form of a solidification rate function whose variable is the degree of supercooling. Thus, it becomes easy to incorporate the solidification rate into the conventional analyzing algorithm.

The "amount" (the amount of solidification, the amount of change therein, etc.) herein includes the "percentage" (fraction solid, for example) as well as the absolute amount. When the solidification analysis is performed, in general, the amount of solidification is expressed by the fraction solid in each of the filled elements. In this specification, the solidification rate is mostly expressed by ($df_s/dt$). The degree of supercooling ($\Delta T$) is the difference between the equilibrium temperature (equilibrium liquidus temperature) that is the temperature in the equilibrium state that depends on the fraction solid ($f_s''$) of the molten alloy and the hypothetical temperature (T*) that is the temperature of the filled elements that is determined by performing heat transfer analysis without considering change in the solid fraction ($f_s''$). The method of calculating the hypothetical temperature (T*), the degree of supercooling ($\Delta T$), and the fraction solid ($f_s''$) will be described later. The "cooling rate" is the variation with time of the temperature of the molten alloy. The cooling rate is determined using the following equation: $R=dT/dt=(T^{N+1}-T^N)/\Delta t$ ($T_N$: temperature at Nth calculation step, $\Delta t$: time step).

(c) Solidification Rate Parameter

The solidification rate parameter is a parameter used in evaluating the influence of the solidification rate on the solidification of the molten alloy, according to the fraction solid. As described in "Influence of Degree of Supercooling on Solidification Characteristics in Solidification Analysis," Foundry Engineering, Volume 78 (2006) No. 1, when only the solidification rate is considered (when the solidification rate parameter of the invention is not considered), the highly accurate results of simulation that are consistent with the actual values are not obtained. The reason of this may be as follows. In the case of the supercooling solidification phenomenon, although the solidification rate is relatively low because the crystal growth rate is determined by the nucleation in the early stage of solidification, in the latter stage, the crystal growth proceeds from the solid phase that has already been crystallized and therefore, the solidification rate becomes sufficiently high according to the degree of supercooling.

Thus, when the solidification rate parameter is set at a relatively low value in the early stage of solidification and the solidification rate parameter is set at a relatively high value in the latter stage of solidification depending on the kind of alloy according to the invention, for example, the actual supercooling solidification phenomenon is appropriately expressed. Thus, when an appropriate solidification rate parameter is selected according to the fraction solid and the amount of change in the fraction solid is calculated with the solidification rate parameter applied to the solidification rate, the highly accurate simulation that is consistent with the actual supercooling solidification phenomenon, becomes possible.

(2) Steps Included in Solidification Analyzing Step

Figure 7:
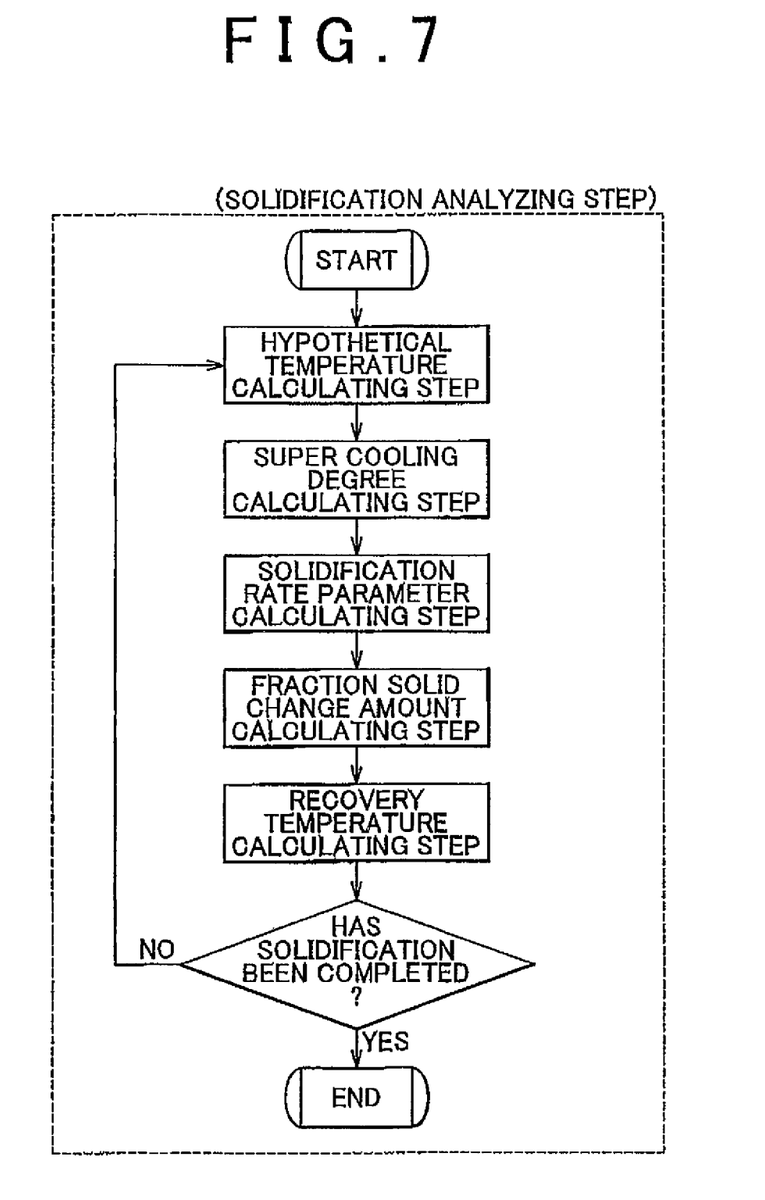
FIG. 7 is a sub flow chart illustrating a solidification analyzing step in the main flow chart.

As shown in FIG. 7, the solidification analyzing step includes a hypothetical temperature calculating step, a supercooling degree calculating step, a solidification rate parameter calculating step, a fraction solid change amount calculating step, and a recovery temperature calculating step, for example. These steps are performed step by step every time the infinitesimal reference time period has elapsed that was set in advance and the solidification behavior of the molten alloy is analyzed in each of the steps, whereby it becomes possible to perform the solidification analysis at a selected time point. These steps will be described below in order.

(a) Hypothetical Temperature Calculating Step

The hypothetical temperature calculating step is a step of calculating the hypothetical temperature (T*) of the filled element that is determined by performing heat transfer analysis, without considering the change in the fraction solid, for the filled element that is the cavity element that contains the molten alloy. For example, the (n+1)th hypothetical temperature calculating step for the time $t=(n+1)\Delta t$ ($\Delta t$: infinitesimal time) is performed as described below.

When the temperature of the mold element at the time $t=n\Delta t$ is $T_m^n$, by solving the energy conservation law equation (1) below, for example, the temperature $T^{*(n+1)}$ of the filled element at the time $t=(n+1)\Delta t$ is obtained. However, the temperature $T^{*(n+1)}$ is a value obtained using the fraction solid ($f_s''$) at the time $t=n\Delta t$ as it is. Specifically, the emission/absorption of the latent heat due to the solidification/melting according to the change in the fraction solid at the time $t=(n+1)\Delta t$ is not taken into consideration. Thus, in this specification, the hypothetical temperature, which means the hypothetical temperature of the filled element at the time $t=(n+1)\Delta t$, is expressed by T*.

Note that the temperature of the mold element is obtained by solving a similar energy conservation law. With regard to the temperature of the mold element, there is no need to consider the temperature variation due to the emission/absorption of the solidification latent heat and therefore, the determined temperature is set as the temperature $T_m^{n+1}$ of the mold element at the time $t=(n+1)\Delta t$.

$$\rho c(\delta T^*/\delta t) = \nabla(\lambda \nabla T_m^n) + Q \quad (1)$$

$\nabla$: nabla
$\rho$: density
c: specific heat
t: time
T: temperature
n: number of calculations in analysis
$\lambda$: heat conductivity
Q: heat generation term
$\Delta t$: amount of change in time
Tn: temperature at time $t=n\Delta t$
(superscript "n" herein indicates the nth step)

(b) Supercooling Degree Calculating Step

The supercooling degree calculating step is a step of calculating the degree of supercooling that is the difference between the temperature of the molten alloy in the equilibrium state that depends on the fraction solid and the hypothetical temperature, for the filled elements. For example, the (n+1)th supercooling degree ($\Delta T^{n+1}$) at the time $t=(n+1)\Delta t$ ($\Delta t$: infinitesimal time) is calculated using the following equation (2).

$$\Delta T^{n+1} = T_L(f_s'') - T^{*(n+1)} \quad (2)$$

$f_s''$: fraction solid of filled element at the time $t=n\Delta t$
$T_L(f_s'')$: equilibrium liquidus temperature when fraction solid is $f_s''$ (c) Solidification Rate Parameter Calculating Step The solidification rate parameter calculating step is a step of calculating or selecting the parameter determined by the fraction solid for the filled elements. The solidification rate parameter may be given in the form of a function whose variable is the fraction solid ($f_s''$), or a predetermined constant or a mathematical expression may be selected depending on the fraction solid in this step. In the specification, for convenience, the solidification rate parameter is expressed by the following equation (3).

$$k = k(f_s^n) \quad (3)$$

(d) Fraction Solid Change Amount Calculating Step

The fraction solid change amount calculating step is a step of calculating the fraction solid change amount that is the amount of change in the fraction solid for the filled elements based on the solidification rate parameter and the solidification rate that depends on the kind of alloy described above. For example, the (n+1)th fraction solid change amount ($\Delta f_s^{n+1}$) at the time t=(n+1)$\Delta$t ($\Delta$t: infinitesimal time) is calculated using the following equation (4).

$$\Delta f_s^{n+1} = k(df_s/dt)^{(n+1)} \Delta t \quad (4)$$

In this equation, $(df_s/dt)^{(n+1)}$ means the (n+1)th solidification rate. The solidification rate varies depending on the kind of alloy and is experimentally determined for each alloy.

The solidification rate is affected by the degree of supercooling ($\Delta T$) described above. Thus, when the degree of supercooling is positive ($\Delta T>0$), solidification proceeds and the fraction solid increases ($\Delta f_s>0$) according to the above equation (4). On the other hand, when the degree of supercooling is zero ($\Delta T=0$), the fraction solid change amount also becomes zero ($\Delta f_s=0$). When the degree of supercooling is negative ($\Delta T<0$), melting proceeds and the fraction solid decreases ($\Delta f_s<0$). When the fraction solid decreases, the amount of decrease is calculated also from the non-equilibrium melting model. However, the amount of decrease can be calculated from the conventional equilibrium melting model, the model in which the melting is not considered, etc.

(e) Recovery Temperature Calculating Step

The recovery temperature calculating step is a step of calculating the temperature of the filled element with the recovery degree applied to the hypothetical temperature, the recovery degree being the amount of change in temperature of the filled element that is determined based on the amount of solidification latent heat corresponding to the fraction solid change amount. For example, the temperature $T^{n+1}$ of the filled element of the (n+1)th calculation for the time t=(n+1)$\Delta$t ($\Delta$t: infinitesimal time) is calculated using the equation (5) below.

$$T^{n+1} = T^{*(n+1)} + (L/c)\Delta f_s^{n+1} \quad (5)$$

L: solidification latent heat
c: specific heat $\Delta f_s$ can be positive, negative, or zero as described above. Thus, naturally, the recovery degree $(L/c)\Delta f_s$ can also be positive, negative, or zero. Thus, the "recovery" means the situation where the temperature is changed from the hypothetical temperature to the actual temperature, that is, the recovery does not mean the increase in temperature. Finally, the (n+1)th fraction solid ($f_s^{n+1}$) is calculated using the equation (6) with the use of the fraction solid change amount ($\Delta f_s^{n+1}$) (fraction solid change amount calculating step).

$$f_s^{n+1} = f_s^n + \Delta f_s^{n+1} \quad (6)$$

The invention will be more specifically described using an example.

<Compiling Solidification Rates into Database>

First, the solidification rates of the molten alloy that are necessary in performing the die-casting simulation of the invention were compiled into a database. Specifically, with the use of casting Al alloy (JIS: ADC12), the die casting experiment and the molten alloy pouring experiment were performed as follows and the solidification rate was measured during the eutectic solidification of the molten Al alloy in each of the cases, whereby the solidification rates of the molten Al alloy were compiled into a database. Note that the chemical composition of ADC12 that was used to prepare the molten Al alloy is as follows: Cu: 2.89%; Si: 11.62%; Mg: 0.21%; Zn: 0.93%; Fe: 0.88%; Mn: 0.34%; Ni: 0.05%; Al: Remaining part (unit: mass percent).

(1) Die Casting Experiment

Figure 13:
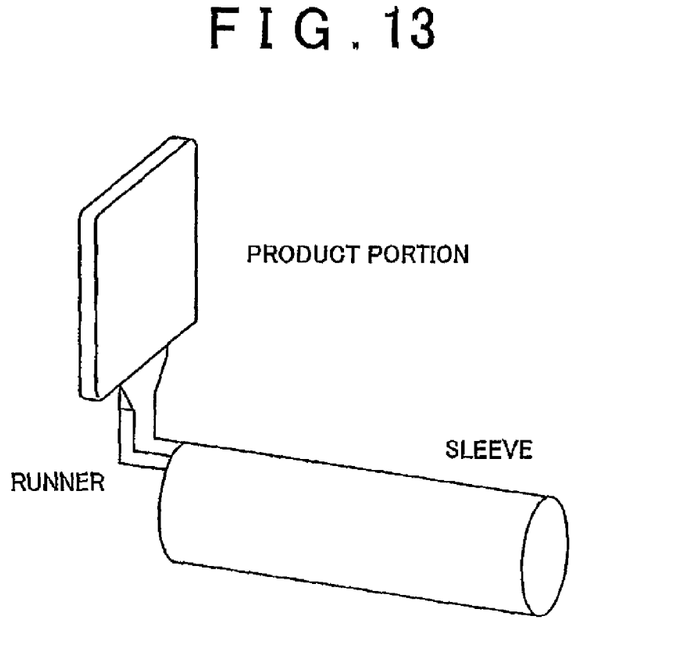
FIG. 13 is an outline drawing showing a product portion of die casting and a mold model for a die-casting simulation.

A die made of tool steel (JIS: SKD61), in which a product portion (cavity) was a plate-shaped cavity with the dimensions of 100 mm×100 mm×2 to 10 mm thick as shown in FIG. 13, was set in a vertical die casting machine (clamping force: 135 t). A highly responsive alumel-chromel thermocouple, of which the diameter at the tip was 0.1 mm and the response time was 0.05 s or less, was attached in the cavity of the mold. The molten Al alloy that was obtained by melting the above Al alloy in an electric resistance furnace was poured into an injection sleeve that was connected to the above-described cavity. When the temperature of the molten alloy reached 610° C., 640° C., or 670° C., the molten Al alloy was filled into the cavity. In this case, the casting pressure (plunger pressure) was set at 50 MPa.

Figure 8:
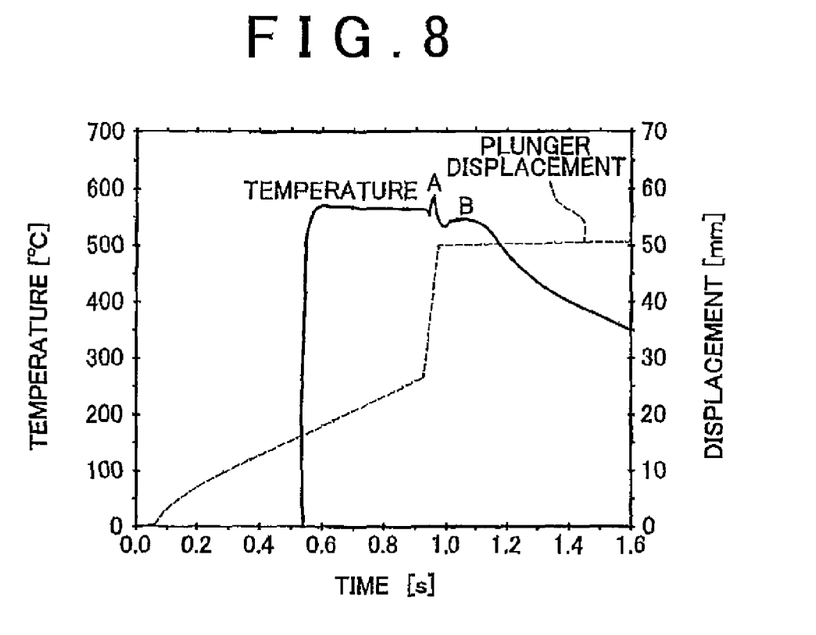
FIG. 8 is a graph, obtained by recording the actual measurement values, that shows variation in temperature of molten alloy.

The temperature of the molten Al alloy when it was injected was set at 670° C. and the variation in temperature was recorded until solidification of the molten Al alloy was completed. The temperature variation is shown in FIG. 8. It can be seen from the plunger displacement shown in FIG. 8 that, from around 0.95 s, there is almost no change in the displacement, which implies that the cavity in the mold is filled with molten alloy. After the temperature of the filled molten alloy became a maximum value (point A in FIG. 8), the temperature rapidly dropped and a period appeared, during which the temperature variation was very small and moderate (point B in FIG. 8). This period is a period, during which the eutectic solidification is progressing. The initial temperature (temperature at point B) is defined as the eutectic solidification temperature in the process of continuous cooling. The eutectic solidification temperature is about 540° C. and is lower than the eutectic solidification temperature of the above-described Al alloy (ADC12) in the equilibrium state (568.4° C.). Thus, it can be understood that the molten Al alloy used in this experiment underwent supercooling solidification.

(2) Molten Alloy Pouring Experiment

The molten Al alloy obtained by melting Al alloy (ADC12) in the electric resistance furnace was poured into various molds and the variation in temperature until solidification of the molten Al alloy was completed was measured with the use of a highly responsive thermocouple (diameter: 0.1 mm) that was the same as the above-described thermocouple. The molds used were a copper mold (50×150×100 mm) and a shell mold ($\phi$40×50 mm). The reason why a plurality of molds were used is to change the cooling rate of the molten Al alloy. Both of the molten alloy pouring experiments were conducted under the conditions that the temperature of the molten Al alloy was 650° C. and the temperature of the mold was the room temperature. Similarly to the die casting experiment described above, the eutectic solidification temperature of each of the cases was read from the measurement results.

(3) Dependency of Eutectic Solidification Temperature on Cooling Rate

Figure 9:
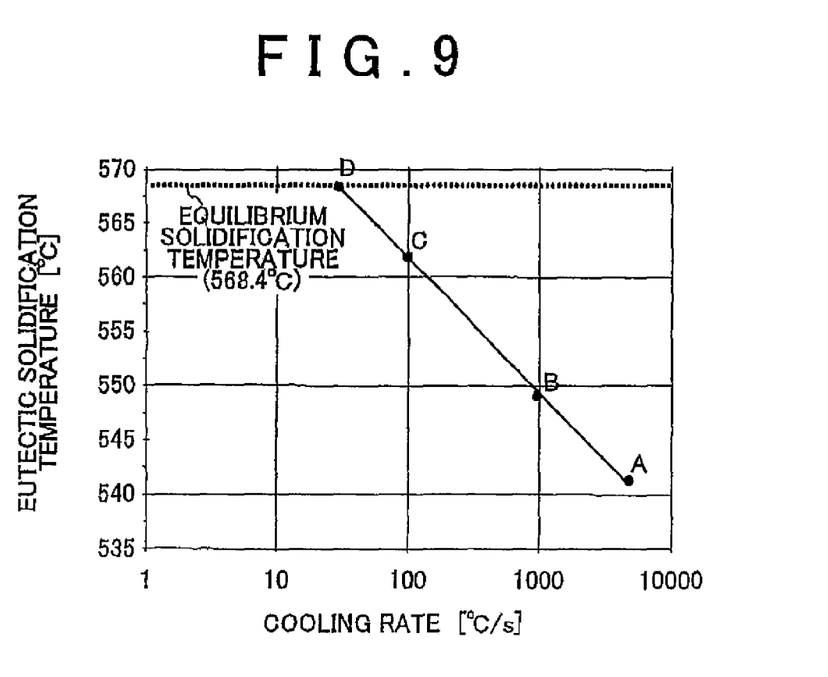
FIG. 9 is a graph showing the dependency of eutectic solidification temperature on cooling rate.

The correlation between the eutectic solidification temperature measured in the die casting experiment and the molten alloy pouring experiments and the cooling rate of each case (the dependency of the eutectic solidification temperature on the cooling rate) is shown in FIG. 9. The cooling rate of each experiment was determined from the cooling rate in a temperature range immediately above the liquidus temperature in the equilibrium state, that is, the cooling rate between 605° C. and 600° C. The points plotted in FIG. 9 are A: Die casting experiment using an SKD61 die (541° C., 5000° C./s), B: Die casting experiment using an SKD61 die (549° C., 1000° C./s), C: Molten alloy pouring experiment using a copper mold (561.5° C., 100° C./s), D: Molten alloy pouring experiment using a shell mold (568.4° C., 30° C./s), in this order from the bottom. The values in the parentheses are the eutectic solidification temperature and the cooling rate in the respective cases.

As is evident from FIG. 9, although the eutectic solidification temperature is close to the eutectic solidification temperature in the equilibrium state (TE: 568.4° C.) when the cooling rate is low, the eutectic solidification temperature is reduced apart from the equilibrium solidification temperature as the cooling rate increases. It has been found from FIG. 9 that the eutectic solidification temperature linearly varies with the common logarithm of the cooling rate.

Figure 10:
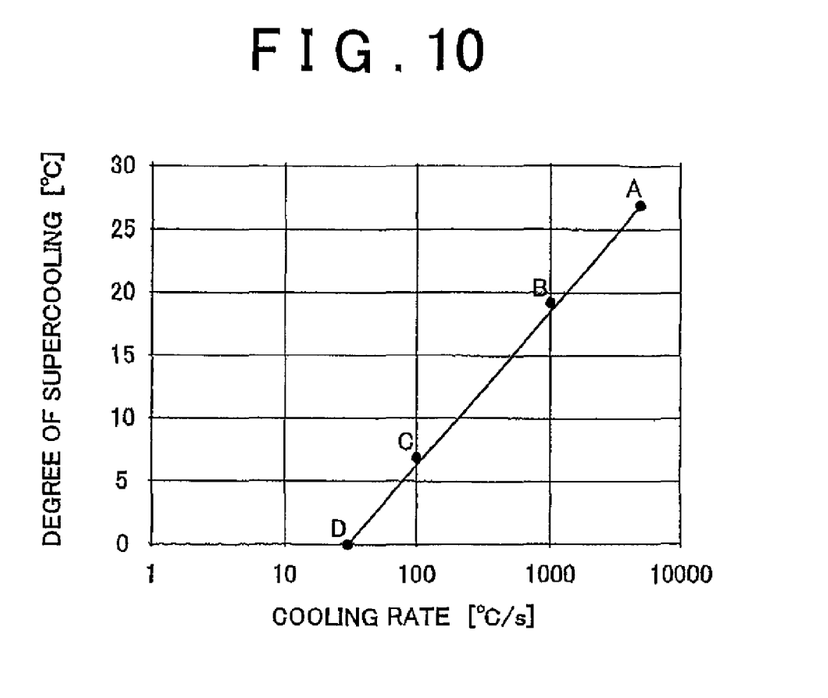
FIG. 10 is a graph showing the dependency of the degree of supercooling on cooling rate.

When the eutectic solidification temperature shown in FIG. 9 is converted into the degree of supercooling, the dependency of the degree of supercooling on the cooling rate shown in FIG. 10 is obtained. The degree of supercooling ($\Delta T$) is the difference ($\Delta T = T_E - T_L$) between the eutectic solidification temperature ($T_L$) of each of the above cases and the eutectic solidification temperature ($T_E$) in the equilibrium state. As is evident from FIG. 10, the degree of supercooling ($\Delta T$) and the common logarithm (log R) of the supercooling rate (dT/dt=R) are expressed by the following linear function.

$$\log R = \alpha \Delta T + \beta \quad (\alpha \text{ and } \beta \text{ are constant}) \quad (11)$$

When the temperature recovery due to the emission/absorption of solidification latent heat is considered, the equation, $df_s = (c/L)dT$, holds and the cooling rate ($df_s/dt$) is expressed as follows using the cooling rate (dT/dt=R).

$$df_s/dt = (c/L)(dT/dt) = (c/L)R$$

c: specific heat
L: solidification latent heat
When the common logarithm of both sides of this equation is taken, the following equation is obtained.

$$\log(df_s/dt) = \log(c/L) + \log R$$

When the above equation (11) is substituted into this equation, the following equation is obtained.

$$\log(df_s/dt) = \log(c/L) + \alpha \Delta T + \beta \quad (12)$$

Figure 11:
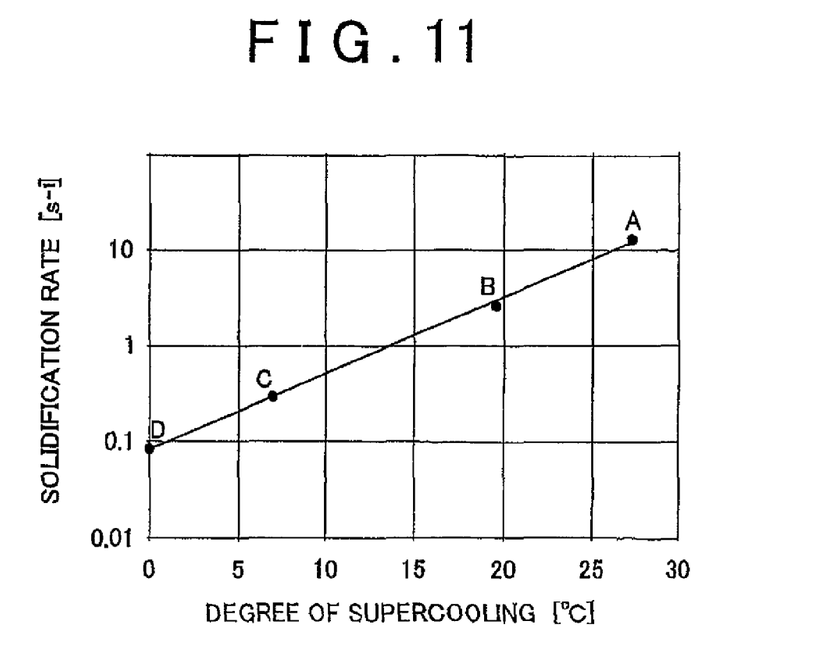
FIG. 11 is a graph showing the relation between solidification rate and the degree of supercooling.

FIG. 11 shows this relation. When the base of the logarithm is changed to the base of the natural logarithm and the coefficients are rewritten, the solidification rate ($df_s/dt$) is expressed as follows using the degree of supercooling ($\Delta T$).

$$df_s/dt = A \exp(B \Delta T) \quad (13)$$

(A=0.078, B=0.19)
The coefficients A and B are calculated on the assumption that c=1063 (unit: J/kg·K), L=388000 (unit: J/kg), $\alpha=-53$, and $\beta=586$.

<<Test1>><Production of Die Casting>
(1) Die
The testing die having the shape shown in FIG. 13 was prepared. The shape of the product portion (casting portion) may be regarded as the cavity shape (region) of the invention. The size of each part is as follows.
Product Portion: 100×100×2 (Thickness) (mm)
Gate: 25 (Width)×2 (Thickness) (mm)
Runner: 10×20×50 (mm)
Sleeve: φ60×300 (mm)
(2) Die Casting
The die casting that is the actual thing was produced using the 135-ton die casting machine with the use of the above mold. During this, care was taken to prevent air in the cavity from being mixed into the molten alloy that was being filled. Specifically, the plunger was moved at a low speed (injection speed: 0.01 m/s) for 0.1 s and then moved at a high speed (injection speed: 0.4 m/s) to fill the molten alloy.

As the plunger for pressurized filling of the molten alloy into the cavity in the mold, a plunger with the size of φ60×300 (mm) was used. The gas in the cavity was discharged through the gas discharging holes and the inside of the cavity was depressurized to 50 torr (actual value in the cavity). The temperature of the molten alloy was kept at approximately 640° C. in a holding furnace. In this way, a flat-shaped test piece (die casting, of which the product portion is 2 mm thick) made of aluminum alloy (ADC12 alloy described above) was obtained.

During the die casting process, the temperature variation from when the cavity in the mold corresponding to the product portion is filled with the molten alloy to when solidification was completed was measured using the alumel-chromel thermocouple with the diameter of 0.1 mm similarly to the above described case. The temperature variation is shown in FIG. 12.

<Die Casting Simulation>
The die casting simulation according to the method of analyzing solidification of molten alloy of the invention was conducted and the result thereof and the actual measurement result described above were compared to evaluate the consistency therebetween. Details will be described below.
(1) Model Setting Step
A mold model used in the die casting simulation was prepared with the use of CAD data prepared when the mold shown in FIG. 13 was designed (model forming step). Then, the mold model was divided into infinitesimal elements (element creating step). The way of division was mesh division, in which rectangular parallelepiped elements were employed. Each of the elements is defined as the cavity element or the mold element (element defining step). The cavity elements near the inner wall surface of the plunger were selected and the inlet position was set at the selected cavity elements (inlet position setting step).
(2) Filling Analyzing Step and Solidification Analyzing Step
The analysis of filling of the molten alloy into the cavity elements (empty elements) of the mold model was performed according to the steps shown in FIG. 6 described above with the actual casting conditions taken into consideration. The completion of filling was determined based on whether 90% or more of the cavity elements had become the filled elements. The analysis of solidification of the molten alloy in the filled elements was conducted according to the steps shown in FIG. 7 described above. The completion of solidification was determined based on whether the fraction solid in the cavity elements had become 1. The simulation ends upon the completion of solidification.

During the simulation, the relation between the solidification rate and the degree of supercooling shown in FIG. 11 and in the equation (13) was defined as the solidification rate function and as shown in Table 1, a plurality of solidification rate parameters k were defined (definition of solidification characteristics). Then, the degree of supercooling ($\Delta T$), the solidification rate parameter, and the fraction solid change amount were calculated in the respective steps. Then, the recovery degree was calculated based on the energy conservation law (see the equation (1)) and the temperature recovery method (see the equation (5)) and the temperature and the fraction solid of each of the filled elements were calculated in order.

Figure 12:
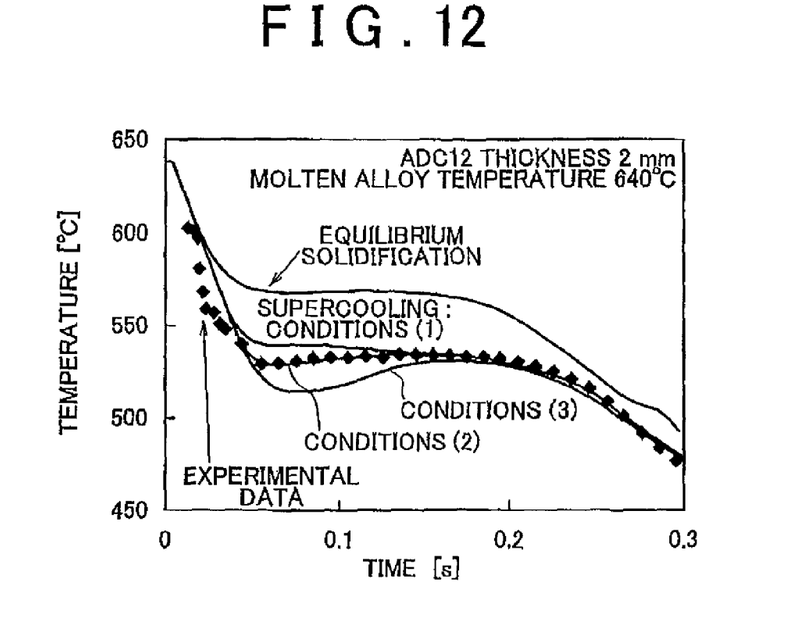
FIG. 12 is a graph showing actual measurement values and results of simulation concerning the relation between the temperature of molten alloy and time.

<Evaluation>
With regard to the temperature change during the die casting, the actual measurement values described above and the analysis results obtained from the above-described simulation are shown in FIG. 12. The results of simulations under the conditions (1) to (3) shown in FIG. 12 respectively correspond to the solidification rate parameters k shown in Table 1. In FIG. 12, the result of simulation concerning the solidification in the equilibrium state, in which supercooling is not taken into consideration, is also shown. First, it can be seen from FIG. 12 that the eutectic solidification in the case of the actual measurement progresses around 535° C. This temperature is lower, by 30° or more, than the eutectic solidification temperature (568.4° C.) in the equilibrium state that is the physical property value of the Al alloy used in this example.

Next, when the equilibrium solidification simulation was conducted, in which the supercooling solidification is not taken into consideration, the eutectic solidification starts from 568.4° C. and deviates from the actual measurement value. Then, when the supercooling solidification simulation according to the invention was conducted, in which the supercooling solidification is taken into consideration, the results of simulations that are close to the actual measurement values were obtained in any of the cases of the conditions (1) to (3). In particular, in the latter period of the solidification process (at and after 0.15 s after filling), the eutectic solidification temperature was 542° C. and was consistent with the actual measurement value in any of the cases of the conditions. Thus, it has been verified that the supercooling solidification phenomenon is accurately reproduced by using the solidification analyzing method according to the invention.

In particular, in the case of the condition (2), in the former period of the solidification process (at and before 0.15 s after filling), the results of simulations were highly consistent with the actual measurement values. Thus, it has been verified that, when the solidification rate parameter is appropriately set and the solidification analyzing method according to the invention is used, not only the above-described supercooling solidification phenomenon but also the temperature recovery phenomenon (recalescence phenomenon) are accurately reproduced.

As is understood by comparing the condition (2) with the conditions (1) and (3), the solidification rate parameter in the range, in which the fraction solid $f_s$ is small (in particular, $f_s$: 0 to 0.01), significantly influences the consistency between the actual measurement values in the former period of the solidification process and the results of simulations.

TABLE 1

| | Solidification rate parameter K | | |
|---|---|---|---|
| Fraction solid $f_s^n$ | Condition (1) | Condition (2) | Condition (3) |
| $0 \leq f_s^n < 0.01$ | 1 | 0.04 | 0.01 |
| $0.01 \leq f_s^n < 0.25$ | | $f_s^n \times 4.0$ | $f_s^n \times 4.0$ |
| $0.25 \leq f_s^n < 0.8$ | | 1 | 1 |
| $0.8 \leq f_s^n < 1$ | | 0.8 | 0.8 |

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations are also within the scope of the invention.

The invention claimed is:

1. A molten alloy solidification analyzing method of analyzing solidification of molten alloy, comprising:

a model setting step of setting a mold model obtained by modeling a mold that forms a cavity, into which the molten alloy is filled, in a coordinate system; and a solidification analyzing step, as executed by a processor, of calculating a solidification process step by step, in which the molten alloy is solidified, based on a fraction solid that is a percentage of solidification of the molten alloy filled into the cavity in the set mold model, wherein the model setting step includes:

a model forming step of forming the mold model by associating a form of the mold model with coordinates in the coordinate system;

an element creating step of creating a plurality of infinitesimal elements, into which a region in the formed mold model is divided; and an element defining step of defining, among the created infinitesimal elements, the infinitesimal element in a cavity region in the mold model as a cavity element, and the infinitesimal element in a mold region in the mold model as a mold element, and the solidification analyzing step includes a fraction solid change amount calculating step of calculating a fraction solid change amount that is an amount of change in the fraction solid in a filled element that is the cavity element containing the molten alloy, based on a solidification rate that is a time rate of change of an amount of solidification determined by a kind of the alloy and on a solidification rate parameter that is a parameter for evaluating an influence of the solidification rate on solidification of the molten alloy, according to the fraction solid, wherein an appropriate solidification rate parameter is selected according to the fraction solid, and the amount of change in the fraction solid is calculated with the solidification rate parameter applied to the solidification rate.

2. The molten alloy solidification analyzing method of claim 1 wherein said fraction solid change amount calculating step is carried out in line with the following equation:

$$\Delta f_s^{n+1} = k(df_s/dt)^{(n+1)}\Delta t$$

wherein $\Delta f_s^{n+1}$ is the (n+1)th fraction solid change amount) at the time $t=(n+1)\Delta t$, $\Delta t$ is an infinitesimal time, $(df_s/dt)^{(n+1)}$ is the (n+1)th solidification rate, k is a solidification rate parameter.

3. The molten alloy solidification analyzing method according to claim 1, wherein the solidification analyzing step further includes: a hypothetical temperature calculating step of calculating a hypothetical temperature ($T^*$) that is a temperature of the filled element obtained by performing heat transfer analysis without considering change in the fraction solid; and a supercooling degree calculating step of calculating a degree of supercooling that is a difference between the hypothetical temperature and an equilibrium temperature that is a temperature of the molten alloy in an equilibrium state that depends on the fraction solid, and the solidification rate is given in the form of a solidification rate function whose variable is the degree of supercooling.

4. The molten alloy solidification analyzing method according to claim 3, wherein said supercooling degree calculating step is carried out in line with the following equation:

$$\Delta T^{n+1} = T_L(f_s^n) - T^{*(n+1)}$$

wherein $\Delta T^{n+1}$ is the (n+1)th supercooling degree at the time $t=(n+1)\Delta t$, $\Delta t$ is an infinitesimal time, $f_s^n$ is the fraction solid of filled element at the time t=nΔt, $T_L(f_s^n)$ is the equilibrium liquidus temperature when fraction solid is $f_s^n$, and $T^{*(n+1)}$ is the hypothetical temperature of the filled element at the time t=(n+1)Δt.

5. The molten alloy solidification analyzing method according to claim 3, wherein the solidification rate function is expressed by a linear function of cooling rate of the molten alloy.

6. The molten alloy solidification analyzing method according to claim 3, wherein the solidification rate function is expressed by an exponential function of the degree of supercooling.

7. The molten alloy solidification analyzing method according to claim 3, wherein the solidification analyzing step further includes a recovery temperature calculating step of calculating the temperature of the filled element with a recovery degree applied to the hypothetical temperature, the recovery degree being an amount of change in temperature of the filled element that is determined based on an amount of solidification latent heat corresponding to the fraction solid change amount.

8. The molten alloy solidification analyzing method according to claim 7, wherein said recovery temperature calculating step is carried out in line with the following equation:

$$T^{n+1} = T^{*(n+1)} + (L/c)\Delta f_s^{n+1}$$

wherein $T^{n+1}$ is the temperature of the filled element of the (n+1)th calculation for the time t=(n+1)Δt, Δt is an infinitesimal time, $f_s^{n+1}$ is the fraction solid of filled element at the time t=(n+1)Δt, $T^{*(n+1)}$ is the hypothetical temperature of the filled element at the time t=(n+1Δt), L is the solidification latent heat and c is the specific heat.

9. The molten alloy solidification analyzing method according to claim 1, wherein the molten alloy is a molten aluminum (Al) alloy or a molten magnesium (Mg) alloy.

10. The molten alloy solidification analyzing method according to claim 9, wherein the molten Al alloy contains 10 to 13% by mass of silicon (Si) when the whole is 100% by mass.

11. A molten alloy solidification analyzing system which performs a molten alloy solidification analyzing method, comprising:
a processor, configured to execute the following:
a model setting step of setting a mold model obtained by modeling a mold that forms a cavity, into which the molten alloy is filled, in a coordinate system; and
a solidification analyzing step of calculating a solidification process step by step, in which the molten alloy is solidified, based on a fraction solid that is a percentage of solidification of the molten alloy filled into the cavity in the set mold model,
wherein the model setting step includes:
a model forming step of forming the mold model by associating a form of the mold model with coordinates in the coordinate system;
an element creating step of creating a plurality of infinitesimal elements, into which a region in the formed mold model is divided; and
an element defining step of defining, among the created infinitesimal elements, the infinitesimal element in a cavity region in the mold model as a cavity element, and the infinitesimal element in a mold region in the mold model as a mold element, and
the solidification analyzing step includes a fraction solid change amount calculating step of calculating a fraction solid change amount that is an amount of change in the fraction solid in a filled element that is the cavity element containing the molten alloy, based on a solidification rate that is a time rate of change of an amount of solidification determined by a kind of the alloy and on a solidification rate parameter that is a parameter for evaluating an influence of the solidification rate on solidification of the molten alloy, according to the fraction solid, wherein an appropriate solidification rate parameter is selected according to the fraction solid, and the amount of change in the fraction solid is calculated with the solidification rate parameter applied to the solidification rate.

12. A non-transitory computer-readable storage medium comprising computer-executable instructions for performing a molten alloy solidification analyzing method, the method executed by the computer executable instructions comprising:
a model setting step of setting a mold model obtained by modeling a mold that forms a cavity, into which the molten alloy is filled, in a coordinate system; and
a solidification analyzing step of calculating a solidification process step by step, in which the molten alloy is solidified, based on a fraction solid that is a percentage of solidification of the molten alloy filled into the cavity in the set mold model,
wherein the model setting step includes:
a model forming step of forming the mold model by associating a form of the mold model with coordinates in the coordinate system;
an element creating step of creating a plurality of infinitesimal elements, into which a region in the formed mold model is divided; and
an element defining step of defining, among the created infinitesimal elements, the infinitesimal element in a cavity region in the mold model as a cavity element, and the infinitesimal element in a mold region in the mold model as a mold element, and
the solidification analyzing step includes a fraction solid change amount calculating step of calculating a fraction solid change amount that is an amount of change in the fraction solid in a filled element that is the cavity element containing the molten alloy, based on a solidification rate that is a time rate of change of an amount of solidification determined by a kind of the alloy and on a solidification rate parameter that is a parameter for evaluating an influence of the solidification rate on solidification of the molten alloy, according to the fraction solid, wherein an appropriate solidification rate parameter is selected according to the fraction solid, and the amount of change in the fraction solid is calculated with the solidification rate parameter applied to the solidification rate.

* * * * *